United States Patent [19]
Fortini

[11] Patent Number: 6,015,212
[45] Date of Patent: Jan. 18, 2000

[54] EYEGLASS FRAME MADE OF WIRE WITH AN ELASTIC ELEMENT

[75] Inventor: Paolo Fortini, Florence, Italy

[73] Assignee: Bottega D'Arte in Firenze S.R. L., Italy

[21] Appl. No.: 09/121,740

[22] Filed: Jul. 23, 1998

[51] Int. Cl.[7] ...................................................... G02C 1/08
[52] U.S. Cl. .............................................. 351/92; 351/95
[58] Field of Search ................................ 351/83, 84, 85, 351/86, 92–102, 106–109

[56] References Cited

U.S. PATENT DOCUMENTS

| | | | |
|---|---|---|---|
| 190,530 | 5/1877 | Yocco | 351/92 |
| 4,360,252 | 11/1982 | Solomon | 351/95 |
| 5,073,020 | 12/1991 | Lindberg et al. | 351/106 |
| 5,135,296 | 8/1992 | Lindberg et al. | 351/106 |

FOREIGN PATENT DOCUMENTS

| | | |
|---|---|---|
| 0 256 098 | 4/1993 | European Pat. Off. . |
| 1 194 067 | 11/1959 | France . |
| 1 380 136 | 10/1964 | France . |
| 2 530 038 | 1/1984 | France . |
| WO 96/02014 | 1/1996 | WIPO . |

*Primary Examiner*—Huy Mai
*Attorney, Agent, or Firm*—McGlew and Tuttle, P.C.

[57] ABSTRACT

An eyeglass frame made of wire is described, which has two end pieces (13), which are connected to a mount part (1) for the lenses (L) in an articulated manner. The mount part has an upper wire (3) and, for each lens, a lower wire (5), and wherein each of the lower wires (5) is fastened with its ends to the upper wire (3). An elastic element (9; 29; 39; 49) is provided at one of the ends of each lower wire to facilitate the mounting of the lenses.

20 Claims, 3 Drawing Sheets

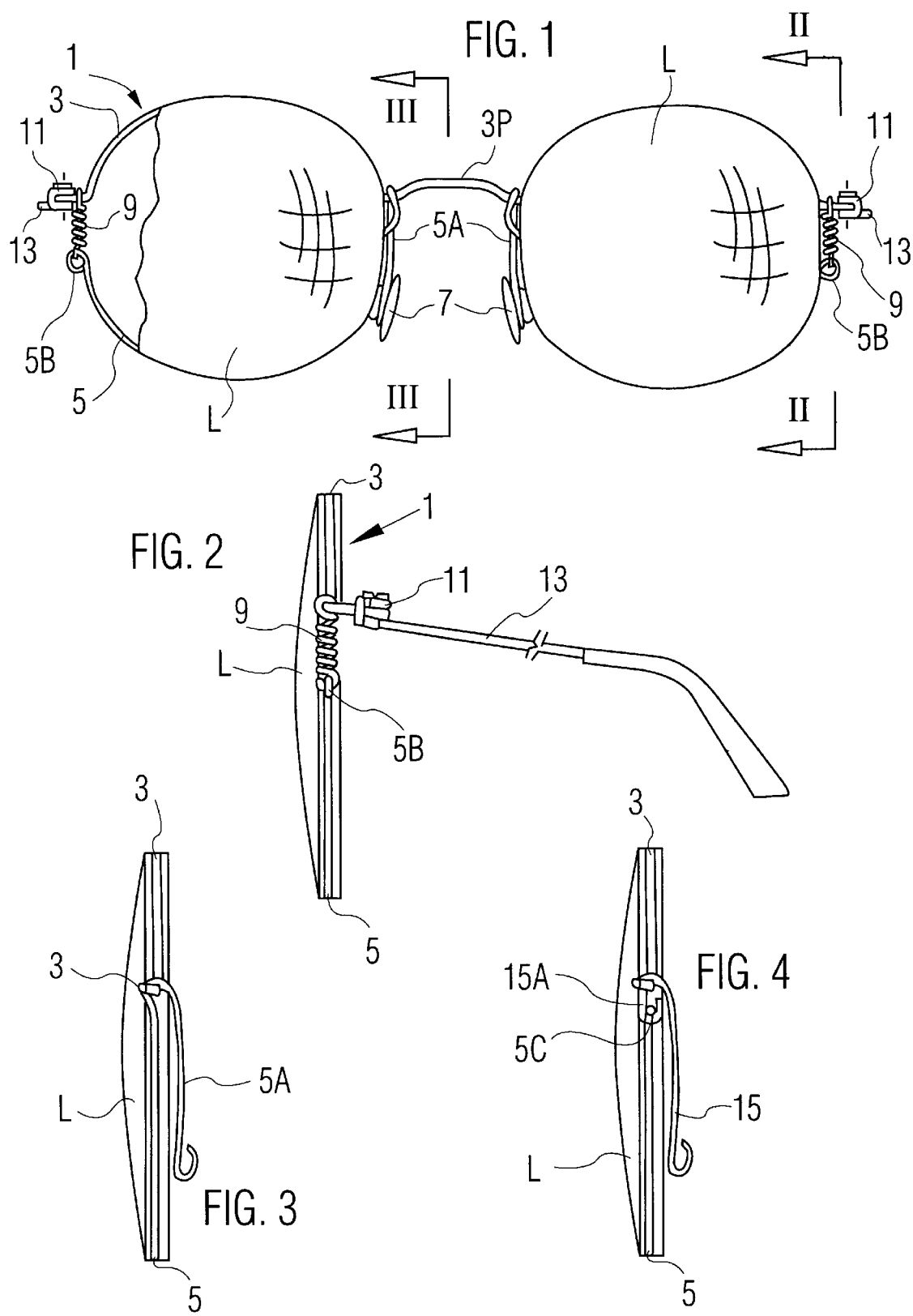

EYEGLASS FRAME MADE OF WIRE WITH AN ELASTIC ELEMENT

FIELD OF THE INVENTION

The present invention pertains to a frame made of wire for so-called eyeglasses with an edge, i.e., eyeglasses with a holding structure for the glass, which surrounds the glass.

The present invention pertains, in particular, to an eyeglass frame made of wire (consisting optionally, but not necessarily of metal) with two end pieces, which are connected to a front part holding the lenses in an articulated manner, wherein this lens-holding front part has an upper wire and—for each lens—a lower wire and each of the lower wires is anchored at its ends to the upper wire.

BACKGROUND OF THE INVENTION

Various systems for manufacturing eyeglass frames from metal wires, which are especially lightweight and resistant, have been developed. No edge is provided around the lenses in a first type of eyeglass frames. Eyeglass frames of this type are described in, e.g., EP-B-0 256 098 and WO-A-9602014.

Eyeglass frames with edge are normally made of plastic as a monolithic structure, in which the lenses are clamped. Systems in which the lower part of the lenses is surrounded by a flexible plastic wire, e.g., one made of "Nylon," have also been contemplated, wherein this plastic wire is anchored in a system of holding holes arranged in an upper part of the frame, then clamped and subsequently cut to size.

A metal wire eyeglass frame with edge is described in U.S. Pat. No. 5,073,020. The assembly of the wires, which form the upper part and the lower parts of the edge, is particularly difficult, because the structure is relatively rigid.

SUMMARY AND OBJECTS OF THE INVENTION

The primary object of the present invention is to provide an eyeglass frame with edge, which is especially reliable, inexpensive, resistant and can be mounted especially easily.

One special object of the present invention is to provide a design made of wire, which makes possible an easy mounting of the lenses, without especially restricted processing tolerances having to be observed.

The above objects as well as other objects and advantages of the present invention, which are understandable to the person skilled in the art from the reading of the following text, are accomplished by a frame of the above-described type, in which an elastic element, e.g., a compression coil spring or preferably a tension coil spring, is provided at one of the ends of each wire that surrounds the lens.

The elastic element makes it possible for the structure made of the upper wire and the lower wires to be stretched in order to accommodate the lens, which has for this purpose a groove extending over its circumference, into which the wires fit. The increased elasticity, which is achieved here, guarantees a reliable holding, and no particularly restricted processing tolerances need to be observed either during the manufacture of the mount, nor during the formation of the groove extending along the edge of the lens, nor during the cutting of the lens to size.

In a practical embodiment of the present invention, the elastic element is arranged in the area of the lateral end of the corresponding lower wire in the vicinity of the hinge of the corresponding end piece.

If the elastic element consists of a tension coil spring or compression coil spring, this spring may consist of an end section of the corresponding lower section or of a piece physically separated from the wire. In practice, the upper wire may form a lateral loop, which is engaged by the elastic element, wherein this loop is located between the upper wire section, which shall be accommodated by a circumferential groove of the lens, and a corresponding hinge, which is arranged between the lens-holding front part and the corresponding end piece.

The upper wire, which also forms a connection web between the two lenses in practice, preferably has a larger diameter than the lower wires. The overall dimension and the overall weight of the frame thus decrease, because the lower wires need to be less resistant and rigid.

In a possible embodiment, the lower wires are extended at their inner ends and form a respective corresponding pad web wing for supporting the frame on the nose, wherein these inner ends are bent such that they form a loop for anchoring at the upper wire. In addition, with its respective end located in the area of a web formed by the upper wire, each of the lower wires preferably forms a hook, which engages a ring formed by a pad web wing, wherein this ring also engages the upper wire. This configuration can also be used when the above-mentioned elastic element is missing, and it can therefore also be used in other types of eyeglass frames with edge.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 1 is a front view of an eyeglass frame according to the present invention;

FIG. 2 is a side view corresponding to line 11—11 in FIG. 1;

FIG. 3 is a local sectional view corresponding to line III—III in FIG. 1;

FIG. 4 is an embodiment variant in a representation corresponding to the section in FIG. 3;

DESCRIPTION OF THE PREFERRED EMBODIMENT

Figure 5:
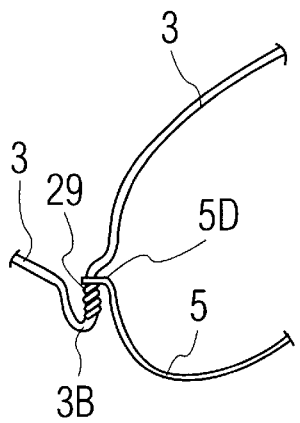
FIGS. 5 is a perspective view of a lens-holding front part in a different embodiment without the lens inserted.

Reference is first made to FIGS. 1 through 3. The eyeglass frame shown there has a mount designated by 1 in its entirety, in which the lenses L are mounted. This lens mount has a first upper wire 3 of a larger diameter, which surrounds the two lenses L at the top and is accommodated in a groove extending along the edge of the lenses, which is visible in FIGS. 2 and 3. In the middle zone, the wire 3 forms a connection web 3P for the two lenses L. Besides this first wire 3, the lens mount 1 has two lower wires 5, each of which surrounds the lower zone of one of the lenses L. The diameter of the wires 5 is smaller than the diameter of the wire 3. The wires 3 and 5 are preferably made metal. However, the use of other materials, eg., plastics, especially for the lower wires, is also possible.

At its inner end, i.e., at the end that is closest to the web, each of the wires 5 has a bent section 5A, which forms a loop for hooking onto the web 3P, which has two slight curves for this purpose. The sections 5A extend farther and form a support each for a corresponding pad web 7, via which the mount is supported on the nose. This pad web is omitted in FIG. 3 in the interest of greater clarity.

At the opposite end, the wires 5 form a ring 5B, which is engaged by the first hook-shaped end of an elastic element 9, which is designed as a tension coil spring in this example. These tension coil springs 9 are hooked with their respective other ends to a section of the upper wire 3, which is located between the lens L and a hinge 11, which connects the mounting part 1 to a pair of end pieces or temples 13, which are advantageously also made of metal wire. The hinges 11 may be advantageously designed in the manner described in WO-A-9602014 or in any other suitable manner.

In the variant shown in FIG. 4, each wire 5 ends in the area of the web 3P in a hook 5C, which is formed by a web 15 consisting of a piece of metal wire, at whose end located opposite the ring 15C the pad web 7 is arranged (which is not shown in FIG. 4 in the interest of greater clarity of the representation). This ring 15A also surrounds the wire 3 in the area of the web 3P.

The structure shown in FIG. 4 is especially advantageous, because it allows less restricted processing tolerances and makes possible an easier mounting.

Figure 6:
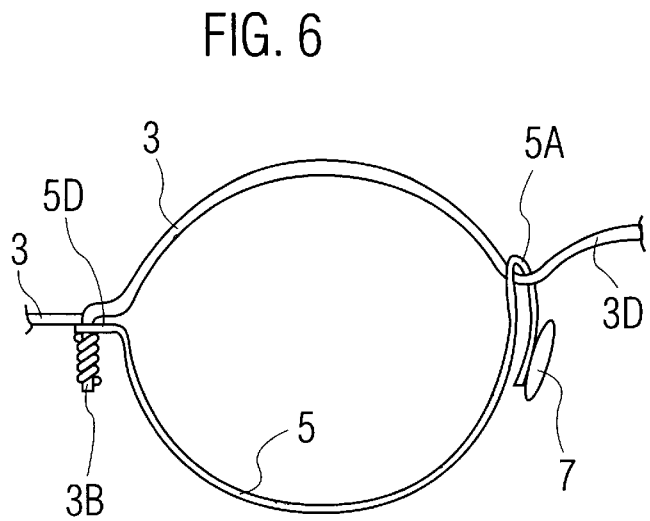
FIGS. 6 is a front view of a lens-holding front part in the different embodiment of FIG. 5 without the lens inserted.

In FIGS. 5 and 6, in which identical or corresponding components are designated with the same reference numbers as in FIGS. 1 through 3, the elastic element consists of a compression coil spring 29, which is arranged on the wire 3 having the larger diameter, while the corresponding lower wire 5 forms a ring 5D, which surrounds the upper wire 3 via the compression spring 29. The latter is thus held between the ring 5D and a loop 3B formed by the wire 3.

Figure 7:
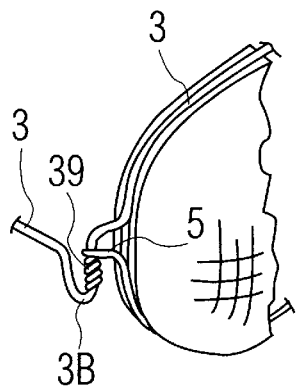
FIGS. 7 is a perspective view of a frame that is the same as the frame in FIGS. 5 and 6, but with the lens inserted.
Figure 8:
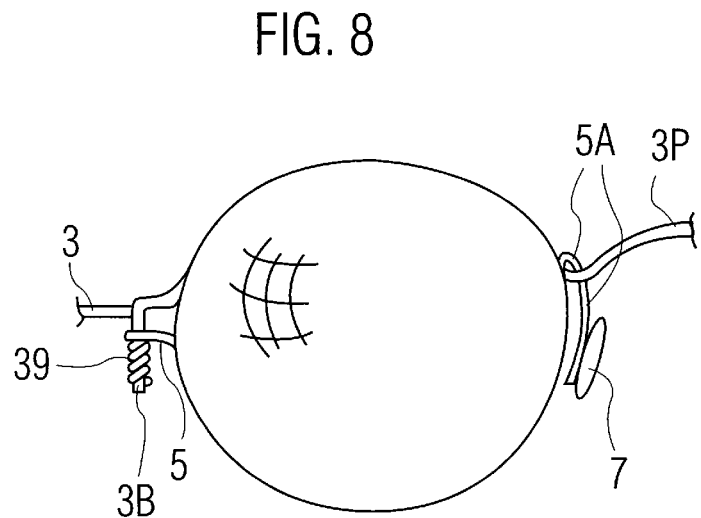
FIGS. 8 is a front view of a frame that is the same as the frame in FIG. 5 and 6, but with the lens inserted.

FIGS. 7 and 8 show an embodiment that is analogous to the embodiment according to FIGS. 5 and 6, but the compression spring 29 is replaced in this case with a compression spring 39 formed from the end area of the corresponding wire 5. Each wire 5 therefore forms both the lower part of the mount of the lens L and the elastic element in this case.

The solution according to FIG. 4 may also be used for the mounting of the pad webs in the embodiments according to FIGS. 5 through 8.

Figure 9:
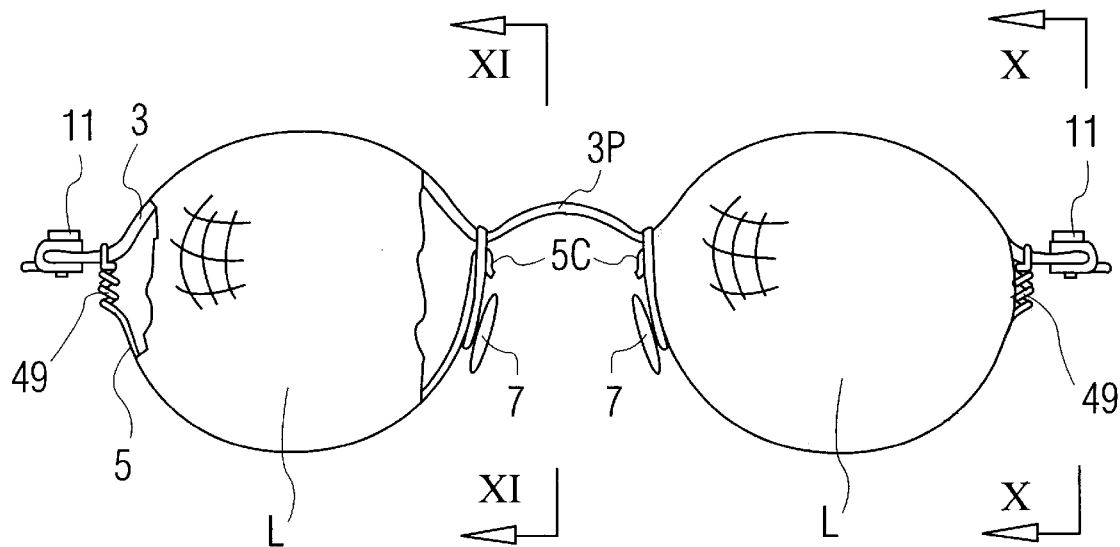
FIG. 9 is the front view of another embodiment.
Figure 10:
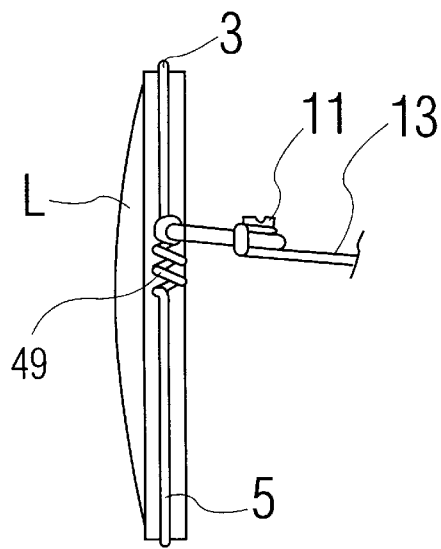
FIGS. 10 is a sectional view corresponding to the lines X—X in FIG. 9.
Figure 11:
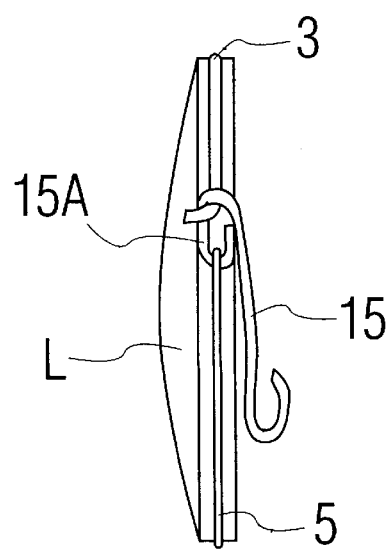
FIGS. 11 is a sectional view corresponding to the lines in FIG. 9.

FIGS. 9 through 11 show another exemplary embodiment, in which the elastic element (designated by 49 here), which is in the form of a tension coil spring here, is again formed from the lower wire 5. The turns of the tension spring 49 are formed by winding around the end area of the wire 3. The sectional view in FIG. 11 shows the solution used in this example for hooking in the pad web wings 15. Other solutions are, of course, also possible, e.g., the solution according to FIG. 3. Identical or corresponding parts are again designated with the same reference numbers as in the above-described embodiments. The embodiment according to FIGS. 9 through 11 is especially simple, economical and easy to mount, and is therefore currently preferred.

The examples shown in the drawings serve, of course, only the purpose of the practical demonstration of the present invention, which may be varied in its forms and arrangements without hereby leaving the concept of the teaching according to the present invention. Any reference numbers given in the claims are only intended to facilitate the reading of the claims with reference to the specification and the drawings and they do not represent any limitation of the scope of protection defined by the claims.

While specific embodiments of the invention have been shown and described in detail to illustrate the application of the principles of the invention, it will be understood that the invention may be embodied otherwise without departing from such principles.

What is claimed is:

1. An eyeglass frame for first and second lenses, the frame comprising:

a mount for the first and second lenses, said mount including an upper wire, a first lower wire for the first lens, and a second lower wire for the second lens, said first lower wire having a first end fastened to said upper wire and having a second end, said mount including a first elastic element connecting said second end of said first lower wire to said upper wire, said second lower wire having a first end fastened to said upper wire and having a second end, said mount including a second elastic element connecting said second end of said second lower wire to said upper wire;

two temples hinged to said mount.

2. The frame in accordance with claim 1, wherein said first and second elastic elements are arranged in the area of said two temples hinged to said mount.

3. The frame in accordance with claim 2, wherein said elastic elements each include a coil spring.

4. The frame in accordance with claim 1, wherein said first and second elastic elements each include a coil spring.

5. The frame in accordance with claim 4, wherein said coil spring is formed by an end section of said lower wires.

6. The frame in accordance with claim 5, wherein said spring is a compression spring.

7. The frame in accordance with claim 4, wherein said spring is a compression spring.

8. The frame in accordance with claim 7, wherein said coil spring is wound around a section of said upper wire.

9. The frame in accordance with claim 4, wherein said coil spring comprises a wire that is physically separated from said first and second lower wires and from said upper wire.

10. The frame in accordance with claim 9, wherein:

said spring has spring ends, said spring has means at said spring ends for connection to said upper wire and to respective said lower wires of the frame and is designed as a tension spring.

11. The frame in accordance with claim 10, wherein said wire forming the turns of said spring also has rings at said spring ends for hooking onto said upper wire and respective said first and second lower wires.

12. The frame in accordance with claim 1, wherein said upper wire forms a lateral loop which is engaged by said elastic elements and is located between a section of said upper wire intended for being accommodated in a circumferential groove of said lens and a hinge arranged between said mount and an associated one of said temples.

13. The frame in accordance with claim 1, wherein said upper wire has a larger diameter than said first and second lower wires.

14. The frame in accordance with claim 1, wherein said first and second lower wires are extended at said first ends to form respective pad web wings for supporting the frame on a nose of a user, wherein said first ends of said lower wires are bent to form a loop for anchoring at said upper wire.

15. The frame in accordance with claim 1, wherein:

said upper wire forms a web;

said first and second lower wires each have said first ends located in an area of said web formed by said upper wire, each of said lower wires forming a hook;

a pad web wing forms a ring, said hook of said lower wires engages said ring, said ring engages said upper wire.

16. The frame in accordance with claim 15, wherein said pad web wing is formed by a piece of metal wire.

17. The frame in accordance with claim 15, wherein said upper wire forms two symmetrical loops and an eyeglass bridge between said symmetrical loops;

another pad web ring forms another ring, wherein said rings formed by said two pad web wings are fastened in an area of said symmetrical loops.

18. Eyeglasses comprising:

first and second lenses;

a mount for the first and second lenses, said mount including an upper wire, a first lower wire for the first lens, and a second lower wire for the second lens, said first lower wire having a first end fastened to said upper wire and having a second end, said mount including a first elastic element connecting said second end of said first lower wire to said upper wire, said second lower wire having a first end fastened to said upper wire and having a second end, said mount including a second elastic element connecting said second end of said second lower wire to said upper wire;

two temples hinged to said mount.

19. An eyeglass frame for first and second lenses, comprising:

a first wire shaped substantially complementary to one side of said first and second lenses;

a second wire shaped substantially complementary to another side of said first lens, said second wire having a first end connected to said first wire at a first end of said first lens, said second wire having a second end;

a third wire shaped substantially complementary to another side of said second lens, said third wire having a first end connected to said first wire at a first end of said second lens, said third wire having a second end;

a first elastic element connecting said second end of said second wire to said first wire at a second end of said first lens;

a second elastic element connecting said second end of said third wire to said first wire at a second end of said second lens.

20. The frame in accordance with claim 19, wherein:

said first elastic element applies an elastic force biasing said first wire and said second wire together;

said second elastic element applies an elastic force biasing said first wire and said third wire together; said first, second and third wires are separate.

* * * * *